(12) United States Patent
Magro et al.

(10) Patent No.: US 9,479,506 B2
(45) Date of Patent: Oct. 25, 2016

(54) AT LEAST ONE MECHANISM TO PERMIT, AT LEAST IN PART, ALLOCATION AND/OR CONFIGURATION, AT LEAST IN PART, OF AT LEAST ONE NETWORK-ASSOCIATED OBJECT

(71) Applicant: Intel Corporation, Santa Clara, CA (US)

(72) Inventors: William R. Magro, Champaign, IL (US); Todd M. Rimmer, Exton, PA (US); Robert J. Woodruff, Banks, OR (US); Mark S. Hefty, Aloha, OR (US); Sayantan Sur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 14/254,609

(22) Filed: Apr. 16, 2014

(65) Prior Publication Data

US 2015/0305006 A1    Oct. 22, 2015

(51) Int. Cl.
*H04W 72/04* (2009.01)
*H04L 29/06* (2006.01)
*G06F 9/50* (2006.01)
*H04W 12/06* (2009.01)
*H04L 29/12* (2006.01)
*G06F 9/44* (2006.01)

(52) U.S. Cl.
CPC ............ *H04L 63/10* (2013.01); *G06F 9/50* (2013.01); *G06F 9/4428* (2013.01); *H04L 61/103* (2013.01); *H04W 12/06* (2013.01)

(58) Field of Classification Search
CPC .. H04W 72/04; H04W 72/0406; C07K 1/16; G01N 30/8675; G01N 33/6848; G01N 2030/8831

USPC ......................................................... 370/437
See application file for complete search history.

(56) References Cited

U.S. PATENT DOCUMENTS

| | | | |
|---|---|---|---|
| 5,179,666 A | 1/1993 | Rimmer et al. | |
| 5,276,896 A | 1/1994 | Rimmer et al. | |
| 5,430,845 A | 7/1995 | Rimmer et al. | |
| 5,574,730 A | 11/1996 | End et al. | |
| 5,603,064 A * | 2/1997 | Bennett .............. | G06F 13/122 370/471 |
| 2001/0042118 A1* | 11/2001 | Miyake .............. | H04L 41/22 709/223 |
| 2006/0239275 A1* | 10/2006 | Zlateff .............. | H04L 29/12009 370/400 |
| 2007/0276966 A1* | 11/2007 | Paul .............. | G06F 9/4411 710/8 |
| 2011/0167154 A1* | 7/2011 | Bush .............. | H04L 12/2807 709/224 |

OTHER PUBLICATIONS

Dan Bonachea "GASNet Specification", Version 1.8, Nov. 2, 2006, pp. 1-34.
Wikipedia, "MapReduce", From Wikipedia, the free encyclopedia, retrieved on Jan. 17, 2014, pp. 1-14.
(Continued)

*Primary Examiner* — Jae Y Lee
*Assistant Examiner* — Jean F Voltaire
(74) *Attorney, Agent, or Firm* — Christopher K. Gagne

(57) ABSTRACT

In an embodiment, at least one interface mechanism may be provided. The mechanism may permit, at least in part, at least one process allocate, at least in part, and/or configure, at least in part, at least one network-associated object. Such allocation and/or configuration, at least in part, may be in accordance with at least one parameter set that may correspond, at least in part, to at least one query issued by the at least one process via the mechanism. Many modifications are possible without departing from this embodiment.

25 Claims, 6 Drawing Sheets

(56) References Cited

OTHER PUBLICATIONS

Mellanox Technologies, "Messaging Accelerator™ 6.0", 2011, 2 pages.
MPI, "A Message-Passing Interface Standard", Message Passing Interface Forum, Version 3.0, Sep. 21, 2012, 852 pages.
Myrinet, "Myrinet Overview", retrieved form: http://www.myricom.com/scs/myrinet/overview/, Jan. 17, 2014, pp. 1-4.
Tarek El-Ghazawi et al., "The Partitioned Global Address Space (PGAS) Programming Languages", PGAS Booth in SC13 #432, Oct. 3-4, 2013, 47 pages.
Brian W. Barrett et al., "The Portals 4.0 Network Programming Interface", Sandia National Laboratories, Nov. 2012, 150 pages.
UPC, "UPC Language Specifications", A publication of the UPC Consortium, Version 1.3, Nov. 16, 2013, 82 pages.
Andrew Russell, "Intel® High Performance Fabrics—Today and Tomorrow", Solution Architect, HPC Fabrics, Intel Corporation, 2012, 20 pages.
Sean Hefty, "OpenFabrics 2.0", Open Fabrics Alliance, Intel Corporation, Jun. 18, 2013, 37 pages.
Sean Hefty, "OpenFabrics 2.0 libfabric", Open Fabrics Alliance, Intel Corporation, Oct. 5, 2013, 28 pages.
Sean Hefty, "fabric: Comment out unused Fl errno values", projects/shefty/libfabric.git/commitdiff, Dec. 19, 2013, 8 pages.
Sean Hefty, "fabric: Rename rdma to rma", projects/shefty/libfabric.git/commitdiff, Dec. 19, 2013, 7 pages.
Sean Hefty, "fabric: Remove be*_t types, use host order instead", projects/shefty/libfabric.git/commitdiff, Dec. 19, 2013, 8 pages.
Sean Hefty, "fabric: Remove unused headers", projects/shefty/libfabric.git/commitdiff, Dec. 19, 2013, 7 pages.
Sean Hefty, "fabric: Declare char * params as const", projects/shefty/libfabric.git/commitdiff, Dec. 19, 2013, 5 pages.
Sean Hefty, "fabric/compat: Deprecate libibverbs/librdmacm calls", projects/shefty/libfabric.git/commitdiff, Dec. 14, 2013, 18 pages.
Sean Hefty, "fabric: Update verbs header to match libfabric headers", projects/shefty/libfabric.git/commitdiff, Dec. 16, 2013, 6 pages.
Sean Hefty, "fabric: Add full compatibility for libibverbs/librdmacm", projects/shefty/libfabric.git/commitdiff, Dec. 13, 2013, 6 pages.
Sean Hefty, "fabric: Move map file", projects/shefty/libfabric.git/commitdiff, Dec. 13, 2013, 2 pages.
Sean Hefty, "fabric: Return unexpected provider errors from fi_getinfo", projects/shefty/libfabric.git/commitdiff, Dec. 12, 2013, 2 pages.
Sean Hefty, "fabric: Divide flag space", projects/shefty/libfabric.git/commitdiff, Dec. 3, 2013, 4 pages.
Sean Hefty, "fabric: Rename mask fields", projects/shefty/libfabric.git/commitdiff, Dec. 3, 2013, 3 pages.
Sean Hefty, "fabric: Split fi_open into separate calls", projects/shefty/libfabric.git/commitdiff, Nov. 27, 2013, 12 pages.
Sean Hefty, "prov/rdmacm: Remove rsocket export", projects/shefty/libfabric.git/commitdiff, Nov. 27, 2013, 4 pages.
Sean Hefty, "fabric: Remove double include of assert.h", projects/shefty/libfabric.git/commitdiff, Nov. 27, 2013, 1 pages.
Sean Hefty, "fabric: Rename fabric socket to fabric endpoint", projects/shefty/libfabric.git/commitdiff, Nov. 27, 2013, 45 pages.
International Search Report in PCT Application No. PCT/US2015/017738, dated Jun. 15, 2015 (4 pages).
Written Opinion of the International Searching Authority in PCT Application No. PCT/US2015/017738, dated Jun. 15, 2015 (5 pages).
Taiwanese Patent Office Official Communication in Taiwanese Patent Application No. 104108074, dated Mar. 30, 2016 (3 pages, with 3 pages of summarized English translation).
Notice of Allowance in Taiwanese Patent Application No. 104108074, dated Jun. 28, 2016 (2 pages, with 1 page of summarized English translation).

* cited by examiner

AT LEAST ONE MECHANISM TO PERMIT, AT LEAST IN PART, ALLOCATION AND/OR CONFIGURATION, AT LEAST IN PART, OF AT LEAST ONE NETWORK-ASSOCIATED OBJECT

TECHNICAL FIELD

This disclosure relates to at least one mechanism to permit, at least in part, allocation and/or configuration, at least in part, of at least one network-associated object, e.g., by at least one process.

BACKGROUND

In one conventional distributed computing system, a switch fabric permits communication among the system's resources. Depending upon the particular application to which the system is intended to be put, the nature and/or characteristics of the fabric and resources may vary. For example, for high performance parallel computing applications, the fabric and resources may be configured so as to provide low latency, high bandwidth, and scalable communication between or among the system's resources and processes. Additionally, in prior conventional techniques, the system's intended usage model has dictated the specific types of programming models and interfaces to be employed. For example, systems that implement scientific coding-related usage models typically have employed the Message Passing Interface (MPI) programming model (e.g., of the type described in "MPI: A Message-Passing Interface Standard, Version 3.0," Message Passing Interface Forum, Sep. 21, 2012) and related/conforming interfaces. Also, for example, conventional systems that operate on irregular data structures have employed the Partitioned Global Address Space (PGAS) programming languages model and related/conforming interfaces. Additionally, for example, conventional systems that process relatively large amounts of data have employed the Map Reduce programming model of Google Inc. of Mountain View, Calif., United States of America, and related/conforming interfaces. The respective underlying philosophies, semantics, and/or other specifics of these programming models and interfaces tend to be very different from each other.

Typically, in order to be able to provide sufficiently high performance, the interfaces are designed in such a way as to be very closely attuned to the specific fabric hardware that is employed in the system. This tends to increase the degree to which such interfaces differ from each other, depending upon the particular programming model and fabric hardware employed in the system.

As can be readily appreciated, as a result of the foregoing, in such conventional systems, hardware or software developed in accordance with a particular programming model, and/or for use with a specific interface and/or fabric hardware often cannot be easily redeployed for use, or interoperate with, other hardware or software developed in accordance with different programming models, and/or for use with other interfaces and/or fabric hardware. Additionally, in such conventional systems, it is often difficult to combine and/or utilize library functions, interfaces, etc. associated with a specific programming model and/or fabric hardware, with other library functions, interfaces, etc. associated with other programming models and/or fabric hardware. Furthermore, none of these conventional systems permit cohesive, robust interoperability of multiple different programming models, libraries, interfaces, and/or fabric hardware in a single system. Additionally, none of these conventional systems facilitate relatively easy extensibility of the programming models and/or interfaces employed (e.g., so as to be enhanced to support new, other, and/or additional features, capabilities, functions, etc.), while also permitting implementation of hardware-specific optimizations.

BRIEF DESCRIPTION OF THE SEVERAL VIEWS OF THE DRAWINGS

Features and advantages of embodiments will become apparent as the following Description of Embodiments proceeds, and upon reference to the Drawings, wherein like numerals depict like parts, and in which.

Although the following Description of Embodiments will proceed with reference being made to illustrative embodiments, many alternatives, modifications, and variations thereof will be apparent to those skilled in the art. Accordingly, it is intended that the claimed subject matter be viewed broadly.

DESCRIPTION OF EMBODIMENTS

Figure 1:
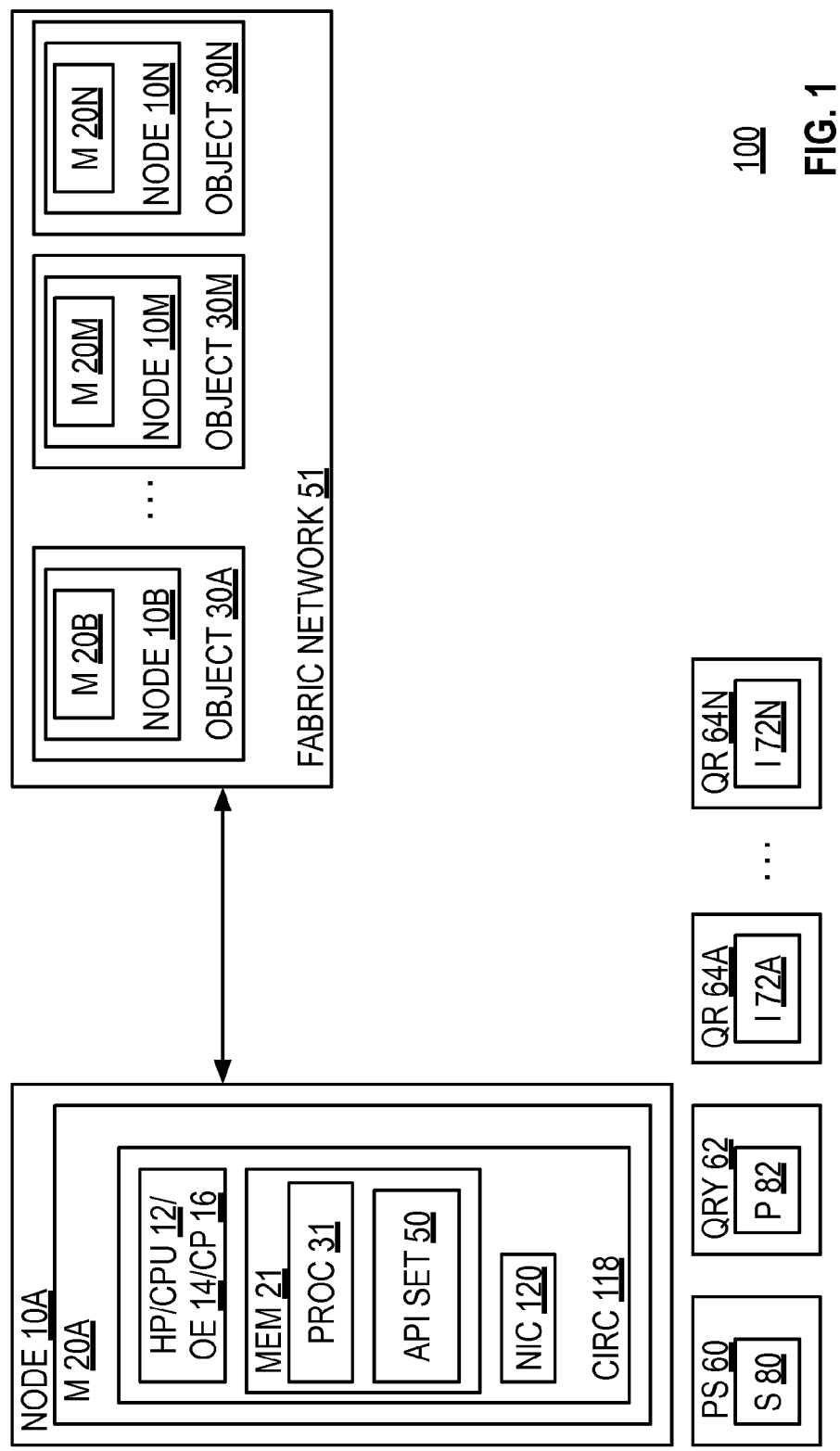
FIG. 1 illustrates a network system embodiment.

FIG. 1 illustrates a network system embodiment 100. Depending upon the particular configuration, system 100 may be advantageously employed for use in connection with and/or in accordance with, and/or to implement, at least in part, one or more usage models. In this embodiment, a usage model may be related to and/or associated with, at least in part, without limitation, one or more programming models, addressing formats, data formats, and/or intended uses, such as, for example, high performance computing, cloud computing, micro-server, scientific, financial services, and/or other intended uses. In this embodiment, system 100 may comprise one or more nodes 10A that may be and/or may become (in a manner that will be described below) communicatively coupled, via one or more fabric (and/or other types of) networks 51, to one or more other nodes 10B . . . 10N that may be comprised, at least in part, in the one or more network 51.

In operation of system 100, one or more nodes 10A . . . 10N may comprise, at least in part, one or more (and in this embodiment, multiple) interface mechanisms 20A . . . 20N that may permit, at least in part, one or more (e.g., user-application and/or other) processes 31 to allocate, at least in part, and/or configure, at least in part, one or more network-associated objects (e.g., 30A) in accordance with, one or more parameter sets 60. For example, in this embodiment, one or more mechanisms 20A . . . 20N may be distributed and/or comprised, at least in part, in multiple of the nodes 10A . . . 10N in the system 100 and/or network 51. In this embodiment, one or more parameters sets 60 may correspond, at least in part, to one or more queries 62 that may be issued, at least in part, by one or more processes 31 via and/or to one or more (e.g., 20A and/or 20B) of the mechanisms 20A . . . 20N. The one or more objects 30A may be one or more (e.g., one or more objects 202A shown in FIG. 2) of a plurality of possible objects (e.g., objects 202A . . . 202N shown in FIG. 2) that may be capable of being instantiated based, at least in part, upon one or more feature sets (e.g., 206A, comprised in feature sets 206A . . . 206N shown in FIG. 2) of one or more devices (e.g., one or more devices 204A comprised in one or more nodes 10B). These one or more devices 204A may select these one or more objects 30A and/or 202A to be instantiated based, at least in part, upon optimization parameters (e.g., one or more optimization parameters 220A comprised in optimization parameters 220A . . . 220N) and/or one or more parameter sets 60. These one or more devices 204A may map, at least in part, these one or more objects 30A and/or 202A to one or more subsets (e.g., 210A) of one or more feature sets 206A that may be correspond, at least in part, to one or more parameter sets 60.

In this embodiment, the terms host computer, host, platform, server, client, network node, and node may be used interchangeably, and may mean, for example, without limitation, one or more end stations, network (and/or other types of) devices, mobile internet devices, smart phones, media devices, input/output (I/O) devices, tablet computers, appliances, intermediate stations, network and/or other interfaces, clients, servers, fabric (and/or other types of) switches, and/or portions and/or components thereof. In this embodiment, a network may be or comprise any entity, instrumentality, modality, and/or portion thereof that permits, facilitates, and/or allows, at least in part, two or more entities to be communicatively coupled together. In this embodiment, a fabric network may be or comprise nodes that are communicatively coupled, at least in part, via one or more switches. In this embodiment, a switch may be or comprise, at least in part, one or more nodes that are capable of forwarding, at least in part, one or more packets, such as for example, one or more crossbar (and/or other types of) switches. In this embodiment, forwarding of one or more packets may be and/or comprise, at least in part, issuing, at least in part, the one or more packets toward one or more (intermediate and/or ultimate) destinations (e.g., via and/or using one or more hops).

In this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also, in this embodiment, an instruction and/or programming may include data and/or one or more commands. In this embodiment, a packet may be or comprise one or more symbols and/or values. In this embodiment, traffic and/or network traffic may be or comprise one or more packets.

In this embodiment, "circuitry" may comprise, for example, singly or in any combination, analog circuitry, digital circuitry, hardwired circuitry, programmable circuitry, processor circuitry, co-processor circuitry, state machine circuitry, and/or memory. As used herein, the term "mechanism" is expressly not to be construed as being a means-plus-function limitation, but instead is to be construed as encompassing any structure, entity, and/or instrumentality that both (1) comprises, at least in part, circuitry, and (2) is capable of performing the function or functions that is or are stated as being performed or performable by the given mechanism.

In this embodiment, a processor, host processor, co-processor, central processing unit (CPU), processor core, core, and/or controller each may comprise respective circuitry capable of performing, at least in part, one or more arithmetic and/or logical operations, and/or of executing, at least in part, one or more instructions. In this embodiment, memory, cache, and cache memory each may comprise one or more of the following types of memories: semiconductor firmware memory, programmable memory, non-volatile memory, read only memory, electrically programmable memory, random access memory, flash memory, magnetic disk memory, optical disk memory, and/or other computer-readable and/or writable memory.

In this embodiment, an object may be or comprise one or more virtual and/or logical entities, and/or constructs that may be associated with, comprise, be mapped to, and/or be related to, at least in part, one or more subsets of one or more feature sets and/or one or more portions of one or more devices. In this embodiment, allocation of an object may be or comprise, at least in part, (1) exclusive and/or non-exclusive reservation of, at least in part, at least one portion of the object for an entity, (2) exclusive and/or non-exclusive association, at least in part, of at least one portion of the object with the entity, and/or (3) instantiation, at least in part, of the object. In this embodiment, configuring of an object may be or comprise, at least in part, defining, establishing, requesting, and/or modifying, at least in part, one or more attributes of the object. In this embodiment, instantiation of an object may be or comprise, at least in part, establishment and/or creation, at least in part, of the object. Examples of objects in this embodiment may include, but are not limited to, one or more hardware components, such as, one or more communication end points, queues, resources, etc.

In this embodiment, a device may be or comprise one or more physical, logical, and/or virtual entities that may comprise, at least in part, circuitry. In this embodiment, a feature set may be, involve, specify, and/or comprise one or more physical, logical, and/or virtual (1) capabilities, functions, resources, and/or operations, (2) portions of circuitry, (3) processes, (4) instructions, (5) instruction sets, and/or (6) capabilities, functions, resources, and/or operations that may result from, be used by, and/or be implementable using one or more such portions of circuitry, processes, instructions, and/or instruction sets.

In this embodiment, a portion or subset of an entity may comprise all or less than all of the entity. In this embodiment, a set may comprise one or more elements. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions. In this embodiment, an interface, such as, for example, an application programming interface (referred to in the single or plural as "API" hereinafter) may be or comprise one or more physical, logical, and/or virtual interfaces via which (1) a first entity provide data and/or one or more signals, commands, instructions to a second entity that may permit and/or facilitate, at least in part, control, monitoring, and/or interaction, at least in part, with the second entity, and/or (2) the second entity may provide other data and/or one or more other signals that may permit and/or facilitate, at least in part, such control, monitoring, and/or interaction, at least in part. In this embodiment, an interface be, comprise, and/or result from, at least in part, one or more processes executed by circuitry.

For example, in this embodiment, one or more mechanisms 20A may comprise, at least in part, circuitry 118. Circuitry 118 may comprise, at least in part, one or more (e.g., multicore) host processors 12, offload engines 14, co-processors 16, memory 21, and/or network interface controllers 120. Memory 21 may comprise one or more instructions that when executed by, for example, circuitry 118, host processors 12, offload engines 14, co-processors 16, memory 21, and/or network interface controllers 120 may result, at least in part, in one or more processes 31 and/or one or more sets of API 50 (1) being executed, at least in part, by circuitry 118, one or more host processors 12, offload engines 14, co-processors 16, memory 21, and/or network interface controllers 120, and/or (2) becoming resident, at least in part, in memory 21. Although not shown in the Figures, each of the nodes 10B . . . 10N and/or mechanisms 20B . . . 20N may comprise, at least in part, components and/or may perform operations that may be similar and/or analogous to the components of and/or operations performed by one or more nodes 10A and/or one or more mechanisms 20A, and vice versa. Alternatively, without departing from this embodiment, the respective nodes 10A . . . 10N and/or respective mechanisms 20A . . . 20N may differ, at least in part, from each other in terms of construction and/or operation. The execution and/or operation of the one or more respective API sets and/or processes that may be comprised in the one or more respective mechanisms 20A . . . 20N may result, at least in part, in performance of the operations that are described herein as being performed by the respective nodes 10A . . . 10N, respective mechanisms 20A . . . 20N, and/or their respective components. In this embodiment, an offload engine may be or comprise, at least in part, circuitry to perform (e.g., in hardware) processing operations in lieu of those processing operations being performed, at least in part, by a CPU and/or software.

Figure 2:
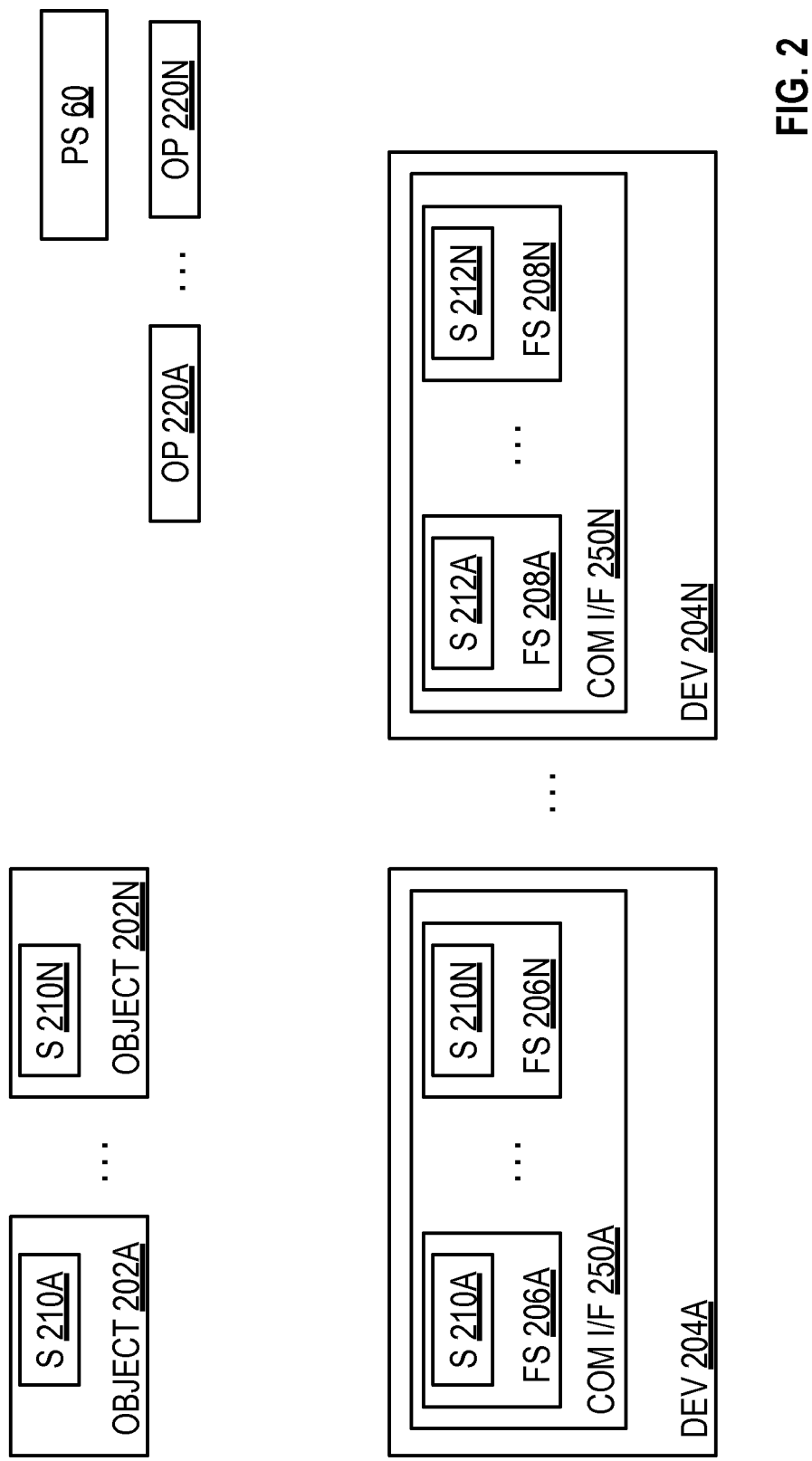
FIG. 2 illustrates features in an embodiment.

After having been allocated and/or configured, at least in part, respective objects 30A . . . 30N may comprise, at least in part, one or more respective portions of one or more respective nodes 10B . . . 10N (see FIG. 1). For example, as shown in FIG. 2, each of the nodes 10B . . . 10N may comprise, at least in part, one or more respective devices 204A . . . 204N that may comprise, at least in part, one or more respective feature sets 206A . . . 206N; . . . 208A . . . 208N. Interface mechanisms 20A . . . 20N may permit, at least in part, the allocation and/or configuration, at least in part, of one or more respective objects 30A . . . 30N that may comprise, at least in part, the one or more respective nodes 10B . . . 10N and/or one or more respective subsets of the one or more respective feature sets that may be comprised, at least in part, in the one or more respective devices that may be comprised, at least in part, in these one or more respective nodes 10B . . . 10N.

For example, as shown in FIG. 2, one or more nodes 10B may comprise, at least in part, one or more devices 204A, and/or one or more nodes 10N may comprise, at least in part, one or more devices 204N. One or more devices 204A may be or comprise, at least in part, a plurality of devices that may comprise, at least in part, one or more (and in this embodiment, a plurality of) feature sets 206A . . . 206N. One or more devices 204N may be or comprise, at least in part, a plurality of devices that may be comprise, at least in part, one or more (and in this embodiment, a plurality of) feature sets 208A . . . 208N. The respective feature sets 206A . . . 206N may each comprise one or more respective subsets 210A . . . 210N of these respective feature sets 206A . . . 206N. The respective feature sets 208A . . . 208N may each comprise one or more respective subsets 212A . . . 212N of these respective feature sets 208A . . . 208N.

In this embodiment, feature sets 206A . . . 206N and/or subsets 210A . . . 210N may be comprised in, associated with, and/or related to, at least in part, one or more communication (and/or other) interfaces 250A of devices 204A. Also, in this embodiment, feature sets 208A . . . 208N may be comprised in, associated with, and/or related to, at least in part, one or more communication (and/or other interfaces) 250N of devices 204N.

In this embodiment, it may be possible to instantiate multiple respective objects based at least in part upon and/or using, at least in part, the one or more respective subsets of the respective feature sets 206A . . . 206N; . . . 208A . . . 208N of these devices 204A . . . 204N. For example, in the case of one or more devices 204A, multiple possible objects 202A . . . 202N may be capable of being instantiated based at least in part upon one or more feature sets 206A . . . 206N. For example, the respective possible objects 202A . . . 202N may be capable of being instantiated such that the respective possible objects 202A . . . 202N correspond to and/or are mapped to, at least in part, respective of the subsets 210A . . . 210N.

Figure 6:
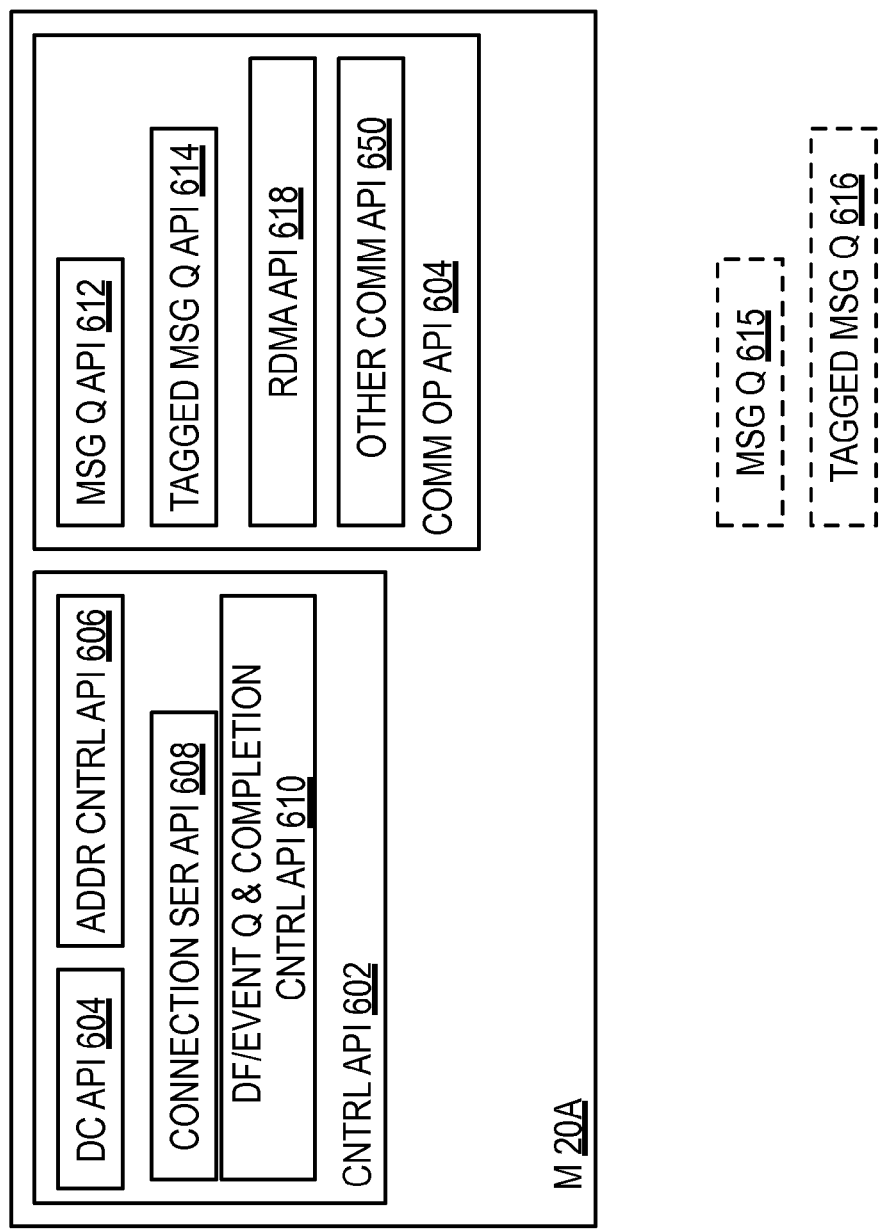
FIG. 6 illustrates features in an embodiment.

In this embodiment, one or more interface mechanisms 20A and/or API sets 50 may comprise multiple interfaces. For example, as shown in FIG. 6, one or more interface mechanisms 20A may comprise one or more control API 602 and/or one or more communication operation API 604. One or more control API 602 may comprise, for example, one or more of the following interfaces: (1) one or more discovery control API 604 that may facilitate, at least in part, the one or more queries 62, (2) one or more addressing control API 606 that may facilitate, at least in part, control, at least in part, of one or more addressing parameters associated, at least in part, with one or more objects 30A . . . 30N, (3) one or more connection services control API 608 that may facilitate control, at least in part, of one or more communication connection parameters that may be associated, at least in part, with one or more objects 30A . . . 30N, and/or (4) one or more data format control API 610 that may facilitate, at least in part, control, at least in part, of one or more data formats to be employed, at least in part, in communications between one or more objects 30A . . . 30N and one or more application processes 31 via one or more mechanisms 20A . . . 20N and/or API sets 50. One or more communication operation API 604 may comprise, for example, one or more of the following interfaces: (1) one or more message queue API 612 that may facilitate, at least in part, sending data and/or receiving data via the one or more message queues 615, (2) one or more tagged message queue API 614 that may facilitate, at least in part, sending and/or receiving at least one tagged message 616, and/or (3) one or more remote direct memory access (RDMA) communication API 618 that may facilitate, at least in part, one or more RDMA data transfer operations involving, at least in part, one or more processes 31 and one or more objects 30A . . . 30N.

In this embodiment, a tagged message may be or comprise, at least in part, a message that may be associated, at least in part, with an identifier that may identify the message as being associated, at least in part, with one or more senders, receivers, and/or processes. The RDMA protocol that may be employed in this embodiment may comply or be compatible with, at least in part, the protocol described in Recio, "A Remote Direct Memory Access Protocol Specification," Request for Comments (RFC) 5040, The Internet Engineering Task Force (IETF), October 2007. Other and/or additional protocols may be employed for communications in one or more networks 100 and/or 51 in this embodiment. Examples of such protocols include, but are not limited to, Ethernet, Transmission Control Protocol/Internet Protocol, and Infiniband protocols. The one or more Ethernet protocols that may be utilized in this embodiment may comply or be compatible with, at least in part, IEEE 802.3-2008, Dec.

26, 2008. The one or more TCP/IP protocols that may be utilized in system 100 may comply or be compatible with, at least in part, the protocols described in Internet Engineering Task Force (IETF) Request For Comments (RFC) 791 and 793, published September 1981. The one or more Infiniband protocols that may be employed in this embodiment may comply or be compatible with, at least in part, the protocol described in Infiniband Architecture Volume I, Release 1.2.1, January 2008, and/or Infiniband Architecture Volume II, Release 1.3, November 2012, Infiniband Trade Association. Many different, additional, and/or other protocols (including, for example, those stated above) may be used for data and/or command exchange in one or more networks 100 and/or 51 without departing from this embodiment (e.g., earlier and/or later-developed versions of the aforesaid, related, and/or other protocols).

In operation, one or more processes 31 may undertake, at least in part, one or more operations that may result, at least in part, in establishing communication, with one or more of the nodes 10B . . . 10N. For example, one or more processes 31 may generate and/or issue, at least in part, one or more queries 62 to one or more nodes 10B . . . 10N via one or more discovery control API 604 that may be comprised, at least in part, in one or more mechanisms 20A and/or API sets 50. One or more queries 62 may comprise and/or be based, at least in part, upon one or more query request parameters 82. These one or more query request parameters 82 may be or comprise, at least in part, one or more subsets 80 of the one or more parameter sets 60 in accordance with which one or more of the objects 30A . . . 30N may (subsequently) be allocated and/or configured, at least in part. One or more query request parameters 82 may request, at least in part, respective query responses 64A . . . 64N (e.g., that may be or comprise, at least in part, information 72A . . . 72N) from nodes 10B . . . 10N and/or devices 204A . . . 204N that may be related to communication interface capabilities of the nodes 10B . . . 10N and/or devices 204A . . . 204N. For example, the information 72A . . . 72N that may be requested by the one or more parameters 82 may be related to the communication capabilities of the communication interfaces 250A . . . 250N and/or the feature sets 206A . . . 206N; 208A . . . 208N and/or feature subsets 210A . . . 210N; 212A . . . 212N that may be associated with and/or embody, at least in part, these communication interfaces 250A . . . 250N. In response, at least in part, to one or more queries 62 and/or parameters 82, devices 204A . . . 204N (and/or nodes 10B . . . 10N) may provide, at least in part, to one or more processes 31, via mechanisms 20B . . . 20M and/or network 51, respective information 72A . . . 72N that may be responsive, at least in part, to one or more queries 62 and/or parameters 82. One or more mechanisms 20A and/or discovery control API 604 may receive, at least in part, respective information 72A . . . 72N, and may present and/or provide the information 72A . . . 72N to the one or more processes 31 in a manner that indicates, at least in part, one or more portions (e.g., information 72A) of the information 72A . . . 72N that may be most likely to best satisfy the one or more queries 62 and/or parameters 82. This may indicate to the one or more processes 31, the one or more corresponding devices (e.g., 204A), feature sets (e.g., 206A), subsets 210A, and/or objects (e.g., 210A and/or 30A) that may offer the greatest likelihood of supporting the best and/or most compatible communication performance with respect to the one or more processes 31, at least in terms of the one or more queries 62 and/or parameters 82.

For example, one or more processes 31 may utilize one or more mechanisms 20A . . . 20N and/or interfaces 604 in the above manner to query resources (e.g., comprising, at least in part, nodes 10B . . . 10N and/or devices 204A . . . 204N) to determine, at least in part, which of these resources (1) may be available for allocation and/or configuration (e.g., as and/or in association with, at least in part, one or more objects 202A and/or 30A) for use, in communications with the one or more processes 31, and/or (2) may have communication interface capabilities that may best support and/or may best fit/match those specified in the one or more queries 62 and/or parameters 82. In response, at least in part, to the one or more queries 62 and/or parameters 82, these respective resources may provide respective information 72A . . . 72N that may indicate, at least in part, their respective resource availability and/or communication interface capabilities. One or more mechanisms 20A (and/or 20B . . . 20N) may modify, at least in part, the ordering (e.g., sequence ordering and/or formatting) of information 72A . . . 72N, and/or may impart and/or imbue to such information 72A . . . 72N one or more emphasis and/or importance characteristics and/or parameters (not shown), such that, as presented and/or provided to one or more processes 31, the manner in which the information 72A . . . 72N may be provided to one or more application 31 may indicate, at least in part, to one or more processes 31 the relative priority of such information 72A . . . 72N to undergo analysis by one or more processes 31. This relative priority may be based, at least in part, upon the respective relative likelihoods of the respective information 72A . . . 72N to be able to satisfy (e.g., in terms of fitting and/or matching) the one or more queries 62 and/or parameters 82. For example, as presented and/or provided to the one or more processes 31, the respective information 72A . . . 72N may be in and/or conform to, at least in part, one or more rank orderings that may correspond, at least in part, to this relative priority. For example, if one or more portions (e.g., information 72A) of the information 72A . . . 72N are most likely to satisfy the one or more queries 62 and/or parameters 82, they may be presented in the one or more rank orderings first, followed by one or more other portions (e.g., information 72N) of the information 72A . . . 72N that are next most likely to satisfy the one or more queries 62 and/or parameters 82, and so forth, for remaining portions of the information 72A . . . 72N. As presented and/or provided, at least in part, to one or more processes 31, respective subsets of the respective information 72A . . . 72N may correspond, at least in part, to respective 30A . . . 30N that may be instantiated based at least in part upon the feature sets (and/or subsets thereof) of the devices 204A . . . 204N.

Figure 3:
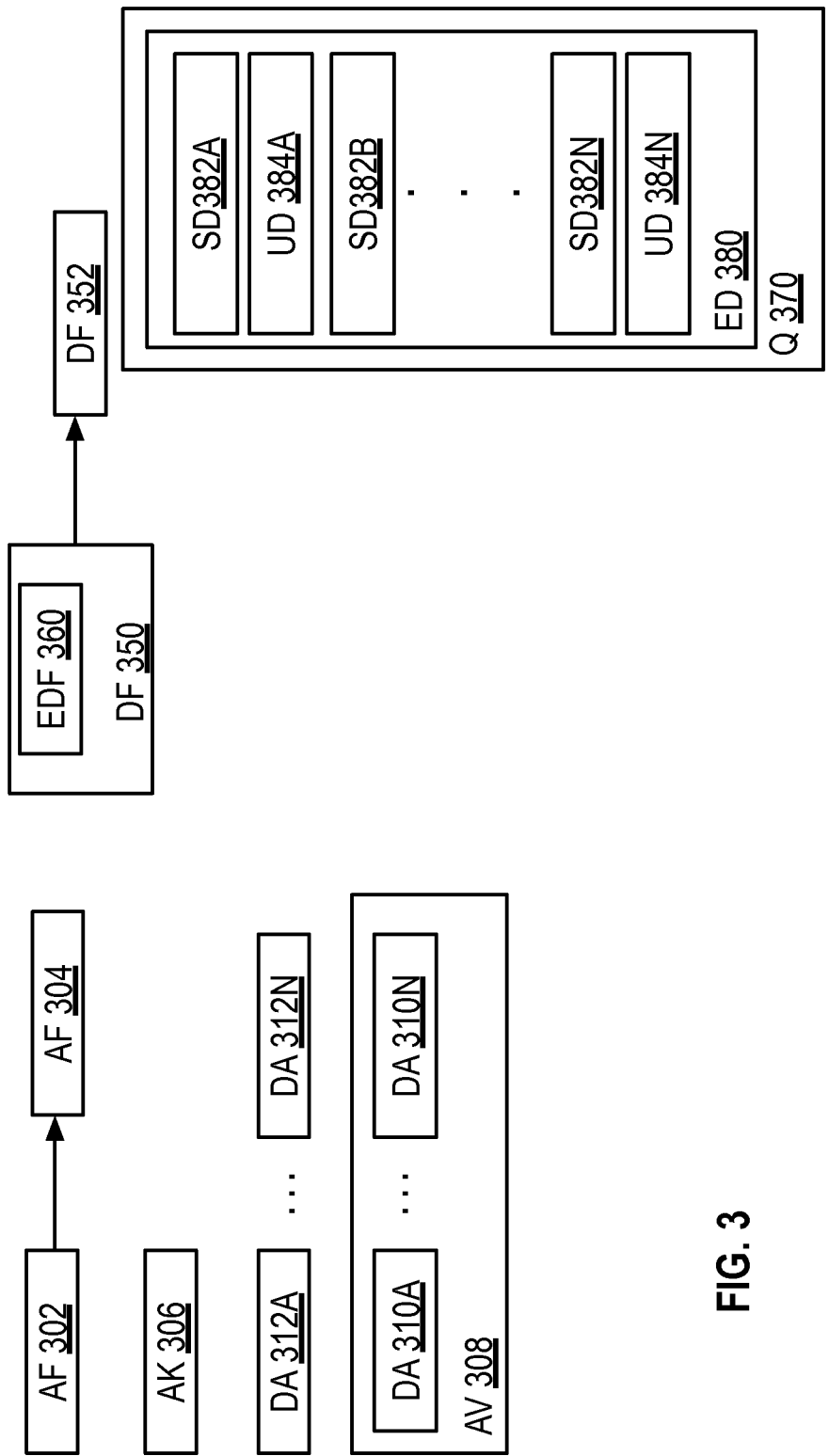
FIG. 3 illustrates features in an embodiment.

One or more mechanisms 20A . . . 20N may expose, at least in part, one or more authorization keys 306 (see FIG. 3) that may be used, at least in part, to determine, at least in part, whether the information 72A . . . 72N that is to be provided, at least in part, to the one or more processes 31 is to be limited, at least in part. For example, one or more mechanisms 20A, API sets 50, and/or API 602 and/or 604 may permit one or more processes 31 to furnish to devices 204A . . . 204N one or more authorization keys 306 that may indicate, at least in part, whether and/or to what extent one or more processes 31 may be permitted to receive information responsive to one or more queries 62 and/or parameters 82. Depending upon the authorization (or lack thereof) indicated by one or more keys 306, the information 72A . . . 72N and/or responses 64A . . . 64N provided by devices 204A . . . 204N may be limited (e.g., so as to provide only that information that may be permitted given such authorization), at least in part.

Based at least in part upon this information 72A . . . 72N and/or the one or more rank orderings thereof, one or more processes 31 may select, at least in part, one or more devices (e.g., 204A), features sets (e.g., 206A), subsets 210A, and/or objects (e.g., 202A and/or 30A) that may offer the greatest likelihood of satisfying the one or more queries 62 and/or parameters 82. One or more processes 31 then may allocate and/or configure (e.g., to, in, and/or as), at least in part, one or more objects 202A and/or 30A to be instantiated, at least in part, in accordance with (e.g., one or more subsets 80 of) one or more parameter sets 60 that may correspond to and/or be comprised in, at least in part, one or more query parameters 82. One or more processes 31 may request, at least in part, this allocation and/or configuration by, for example, providing to one or more devices 30A (e.g., via one or more mechanisms 20A and/or 20B) one or more data structures 560 (see FIG. 5).

Figure 5:
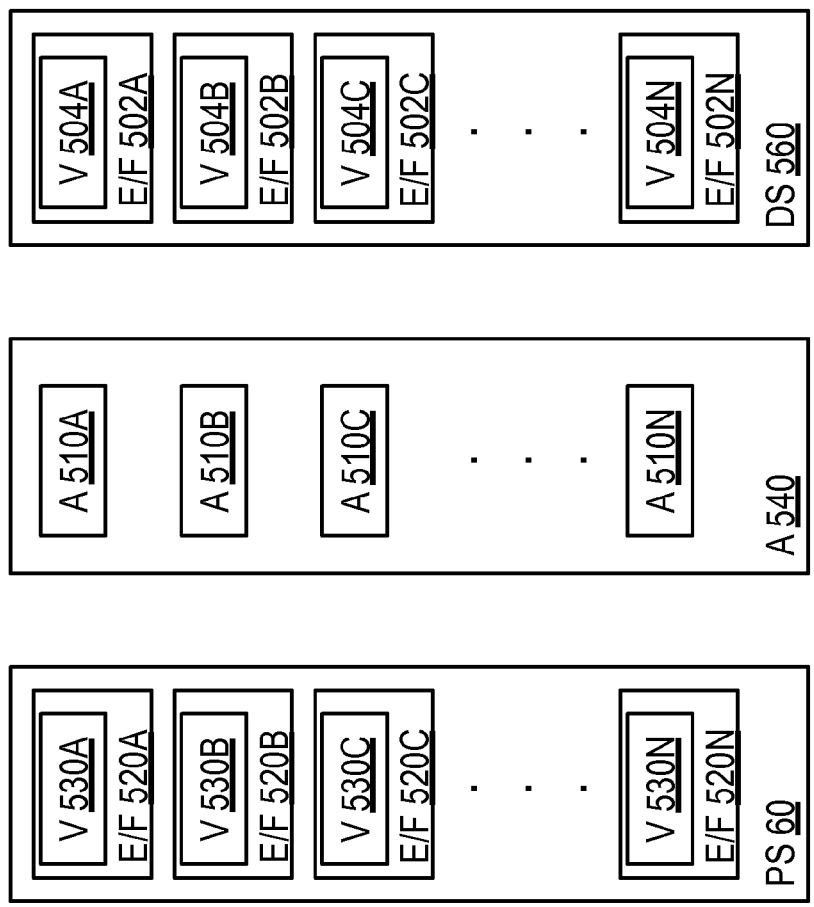
FIG. 5 illustrates features in an embodiment.

For example, as shown in FIG. 5, one or more parameter sets 60 (and/or, although not shown, alternatively or additionally, one or more subsets 80) may be or comprise one or more elements and/or fields 520A . . . 520N that may correspond, at least in part, to attributes 540 of and/or that are to be instantiated as, in, and/or as part of one or more objects 202A and/or 30A. For example, attributes 540 may comprise, at least in part, one or more (and in this embodiment, a plurality of) attributes 510A . . . 510N. These attributes may be specified, at least in part, one or more data structures 560 that may be generated and/or issued, at least in part, from the one or more processes 31 (e.g., via one or more mechanisms 20A and/or one or more of API 602, 606, 608, and/or 610) to, and/or to be received (e.g., by and/or via one or more mechanisms 20B and/or one or more appropriate corresponding API thereof depending upon, for example, particular functionality of the API), at least in part, by one or more devices 204A. One or more data structures 560 may comprise, at least in part, one or more elements and/or fields 502A . . . 502N. One or more (e.g., 502A) of these fields 502A . . . 502N may indicate, at least in part, which of the other elements (e.g., 502B . . . 502N) of the one or more data structures 560 may contain one or more respective values that may have been validly enumerated by one or more processes 31 (e.g., prior to and/or contemporaneously with being generated and/or issued by one or more processes 31).

For example, elements 520A . . . 520N may be, have, and/or comprise, at least in part, respective values 530A . . . 530N. These values 530A . . . 530N may correspond to and/or be reflected in, at least in part, attributes 510A . . . 510N. These attributes 510A . . . 510N and/or values 530A . . . 530N may correspond to and/or be reflected in the respective values 504A . . . 504N of respective fields 502A . . . 502N. However, if one or more parameter sets 60 and/or subsets 80 were to comprise fewer elements and/or values than were previously described, such that, for example, one or more elements 520N and/or values 530N were not present therein, then, in this example, one or more attributes 510N also may not be present in attributes 540. Therefore, as generated and/or issued, at least in part, by one or more processes 31, one or more data structures 560 may not comprise one or more fields 502N and/or values 504N that may correspond, at least in part, to one or more attributes 510N, elements 520N and/or values 530N.

In the above exemplary situation, one or more of the other fields and/or values comprised in one or more data structures 560 (e.g., one or more fields 502A and/or values 504A) may indicate, at least in part, that the validly enumerated fields and/or values that may be comprised in one or more data structures 560 does not include one or more fields 502N and/or values 504N. For example, in this embodiment, there may be multiple possible versions of the protocol or protocols that may be employed to use one or more mechanisms 20A . . . 20N. Each of these versions may be associated with and/or utilize a respective predetermined version of the one or more data structures 560. Each of these respective versions of the one or more data structures 560 may comprise, be associated with, and/or utilize respective predetermined types, classifications, and/or numbers of fields and/or values. When generating and/or issuing one or more data structures 560, one or more processes 31 may indicate, at least in part, in one or more elements 502A and/or values 504A (1) the one or more versions of the protocol or protocols that the one or more data structures 560 may be associated with, and/or (2) one or more mask and/or other values that may indicate, at least in part, which of the possible elements and/or values have been validly enumerated (e.g., in accordance with the particular protocol version or versions). A receiver of the one or more data structures 560 may examine the one or more fields/elements 502A and/or values 504A to determine, at least in part, which of the possible fields/elements of one or more data structures 560 may have been validly enumerated by one or more processes 31 in accordance with the particular one or more versions of the protocol or protocols that one or more processes 31 may have generated and/or issued the one or more data structures 560. Advantageously, this may make it relatively easy to extend, modify, and/or change the version, fields, elements, and/or values that may be employed in one or more data structures 560, and/or the protocol that may employed to use the one or more mechanisms 20A . . . 20N, while maintaining, at least in part, forward and/or backward compatibility with other (e.g., newer and/or older) versions of such protocols and/or one or more data structures 560. Further advantageously, this dynamic configuration capability may avoid inclusion and/or use of unnecessary fields/elements of the one or more data structures 560, may result in reduced stack (and/or other) memory space consumption (e.g., to store data structure elements and/or associated data), and also may reduce associated processing cycles and power consumption.

Various other elements 502B . . . 502N and/or values 504B . . . 504N in one or more data structures 560, their corresponding attributes in attributes 540, and/or their corresponding elements in one or more parameters sets 60, subsets 80, and/or parameters 82 may correspond and/or be related to, at least in part, to various aspects to be instantiated in and/or by one or more objects 202A and/or 30A. For example, one or more parameters 82 may be related to, at least in part, one or more requested addressing formats 302 (see FIG. 3) that one or more processes 31 are to employ, at least in part, in communicating with one or more objects 30A and/or 202A (e.g., via one or more mechanisms 20A and/or 20B). Accordingly, for example, one or more addressing format elements (e.g., 502B) and/or values (e.g., 504B) may indicate, at least in part, these one or more requested addressing formats 302. In this example, one or more devices 204A may be capable of translating, at least in part, these one or more requested addressing formats 302 to one or more other addressing formats 304 (see FIG. 3) that may be utilized, at least in part, by one or more devices 204A (and/or one or more components, portions, feature sets, etc. thereof) for one or more (e.g., communication-related) operations that may be implementable, at least in part, by one or more devices 204A and/or objects 30A/202A. Additionally or alternatively, one or more addressing formats 304 may be utilized, at least in part, by one or more other (e.g., downstream) objects (e.g., 30M, 30N), nodes (e.g., 10M, 10N), and/or devices (e.g., 204N) in network 51, and/or one or more components, feature sets, and/or portions thereof.

In this embodiment, an address may be, comprise, and/or indicate, at least in part, one or more logical, virtual, and/or physical locations. In this embodiment, an addressing format may be, comprise, embody, and/or indicate, at least in part, (1) manner and/or form in which address information is conveyed and/or symbolized, and/or (2) meaning of characters, values, and/or symbols (and/or one or more portions thereof) that may be used to convey and/or symbolize addressing information, such as, for example, without limitation, whether one or more characters, values, and/or symbols convey network address information, logical address information, physical address information, etc. Accordingly, in this embodiment, the translation and/or resolution of a network/internetwork/logical/virtual address, and/or of the address format of such an address may (but is not required to) comprise, at least in part, converting the address into one or more corresponding physical/medium access control addresses, or vice versa.

Additionally or alternatively, in this embodiment, one or more parameters 82 may be related to, at least in part, one or more requested data format 350 (see FIG. 3) that one or more processes 31 are to employ, at least in part, in communicating with one or more objects 30A and/or 202A (e.g., via one or more mechanisms 20A and/or 20B). Accordingly, for example, one or more data format elements (e.g., 502C) and/or values (e.g., 504C) may indicate, at least in part, these one or more requested data formats 350. For example, in this embodiment, one or more data formats 350 may comprise, at least in part, one or more event data formats 360 for (e.g., reporting to one or more processes 31) event data 380 that may be comprised in and/or obtained, at least in part, from one or more event (e.g., communication operation completion) queues 370 that may be associated, at least in part, with and/or comprised, at least in part, in one or more objects 30A/202A and/or one or more devices 204A. Such event data 380 may comprise, at least in part, successfully-completed (e.g., communication-related) operation data (e.g., 382A, 382B, . . . 382N) and/or unsuccessfully (e.g., communication-related) operation data (e.g., 384A . . . 384N). For example, one or more processes 31 may select the particular contents of one or more elements 502C and/or values 504C so as to select one or more particular corresponding event data formats 350. These one or more event data formats 360 may be selectable, at least in part, by one or more processes 31 such that the manner in which the successfully-completed and/or unsuccessfully-completed operation data are interspersed with each other in being and/or as reported to the one or more processes 31 may be selectable, at least in part. For example, the particular contents of the one or more elements 502C and/or values 504C may select such one or more data formats 350 such that, regardless of their particular interspersing and/or ordering relative to each other in the one or more event queues 370, any and all of the unsuccessfully-completed operation data in the one or more queues 370 is to be reported to the one or more processes 31 before any of the successfully-completed operation data in the one or more queues 370 is to be reported to the one or more processes 31. Additionally or alternatively, the one or more data formats 350 may indicate, at least in part, other types and/or conditions of one or more formats of data (e.g., big endian, little endian, etc.) that may be communicated between the one or more processes 31 and one or more objects 30A/202A (and/or one or more devices 30A). Advantageously, these features of this embodiment may permit one or more processes 31 to be able to control, at least in part, whether communication operations that unsuccessfully complete are reported together with interspersed successfully completed operations, or in parallel, via one or more "virtual" queues. Advantageously, this may reduce the number of comparisons (and/or other processing) that one or more processes 31 may execute in order to obtain event data that may be immediately actionable and/or important.

Additionally or alternatively, in this embodiment, one or more parameters 82 may be related to, at least in part, one or more connection services (e.g., specifying one or more parameters related to connection-oriented, connectionless, etc. communication services), and/or other desired communication parameters (e.g., parameters related to buffering and/or queuing to be employed, multicasting, socket types, size of packets/frames, network management, events to be flagged, descriptor format/content, function/protocol libraries to be employed, communication protocol or protocols, version, communication operations that may be executed atomically, etc.) that one or more processes 31 are to employ, at least in part, in communicating with one or more objects 30A and/or 202A (e.g., via one or more mechanisms 20A and/or 20B). Accordingly, for example, one or more other of the elements 502A . . . 502N and/or values 504A . . . 504N may indicate, at least in part, these one or more requested communication services and/or other parameters.

In response, at least in part, to one or more data structures 560, one or more devices 204A may select, at least in part, one or more objects 202A and/or 30A to be instantiated based at least in part upon optimization parameters (e.g., 220A selected from optimization parameters 220A . . . 220N) and/or one or more parameter sets 60 (e.g., as reflected and/or indicated, at least in part, in the elements 502A . . . 502N and/or values 504A . . . 504N comprised in one or more data structures 560). As part of this instantiation, one or more devices 204A may map, at least in part, one or more objects 30A and/or 202A to one or more subsets 210A of the one or more feature sets 206A so as to accommodate and/or implement, at least in part, the object allocation and/or configuration requested by one or more processes 31 (e.g., by generating and/or issuing, at least in part, one or more data structures 560).

Figure 4:
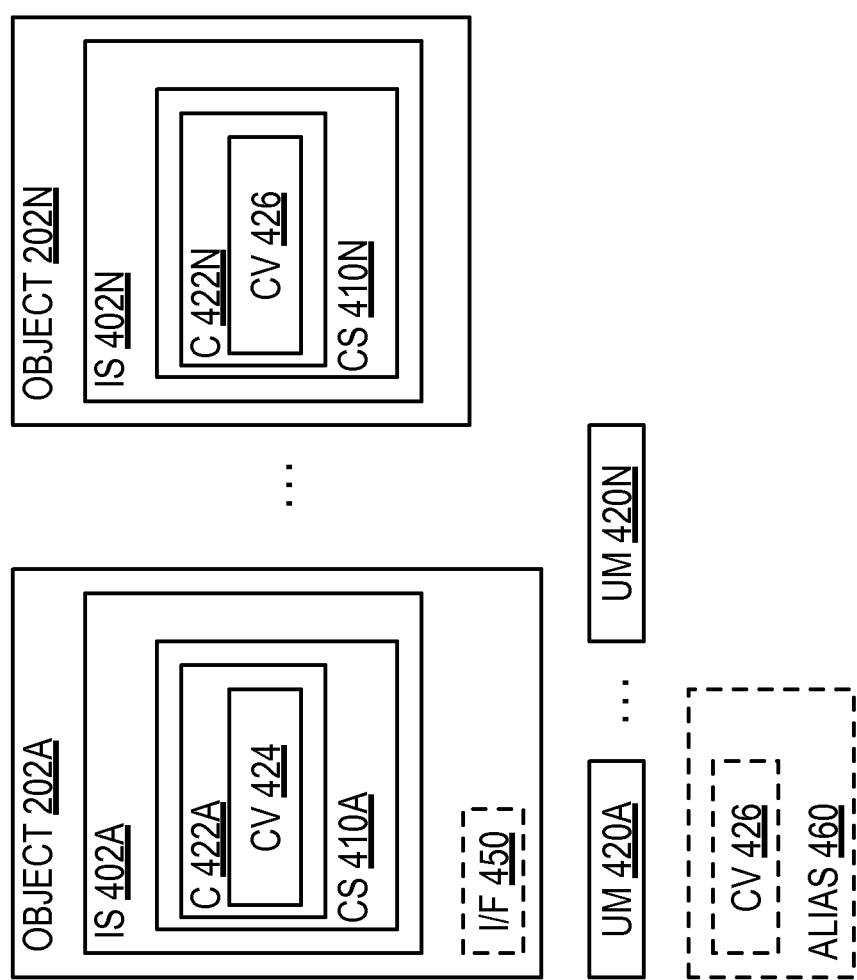
FIG. 4 illustrates features in an embodiment.

Additionally or alternatively, without departing from this embodiment, as shown in FIG. 4, possible objects 202A . . . 202N may comprise, at least in part, respective sets of (e.g., communication-related) interfaces 402A . . . 402N that may correspond to and/or be implemented, at least in part, to respective feature subsets 210A . . . 210N. These respective sets of interfaces 402A . . . 402N may comprise, at least in part, respective sets of (e.g., communication operation-related and/or other) calls 410A . . . 410N. These respective sets of calls 410A . . . 410N may be associated with and/or be used to implement, at least in part, respective usage models (symbolically illustrated by elements 420A . . . 420N in FIG. 4) of one or more devices 204A (and/or nodes 10A, 10B and/or network 51). In this embodiment, two or more (e.g., 410A, 410N) of these sets of calls 410A . . . 410N may include respective calls (e.g., 442A, 442N) that may perform analogous, similar, or identical (e.g., communication-related and/or other) functions (e.g., a "send" function), but may do so via and/or utilizing different respective coding versions (e.g., 424, 426). These different respective coding versions 424, 426 may be best suited to different respective ones (e.g., 420A, 420N) of the usage models 420A . . . 420N.

In this example, one or more parameter sets 60 may correspond to (e.g., features and/or characteristics of and/or embodied in), at least in part, one or more (e.g., 420A) of the usage models 420A . . . 420N. The optimization parameters 220A . . . 220N also may be associated with respective usage models 420A . . . 420N. In instantiating, at least in part, one or more objects 202A and/or 30A, one or more devices 204A may select, at least in part, the one or more objects 202A and/or 30A that may be instantiated such that these one or more objects 202A and/or 30A may comprise one or more (e.g., 402A) of the sets of interfaces 402A . . . 402N that may comprise one or more (e.g., 422A) of the sets of calls 422A . . . 422N that may best fit, match, and/or be used to implement the one or more usage models 420A to which the one or more parameter sets 60 may correspond, at least in part. The selection of the one or more sets of calls 422A may be based, at least in part, upon the one or more optimization parameters 220A and/or parameter sets 60 that may be associated with one or more usage models 420A. Advantageously, in this embodiment, this may permit one or more particular desired usage models (e.g., 420A) to be implemented, while also reducing the number and/or complexity of program code branches, paths, and/or other program code that otherwise may have been executed to do so. Advantageously, this may improve processing performance, reduce processing latency, and reduce memory and processing cycles that may be consumed in this embodiment. Additionally or alternatively, without departing from this embodiment, the one or more data structures 560 may include one or more fields and/or elements (not shown) that may permit one or more processes 31 to override, at least in part, the above object selection and/or instantiation process by one or more devices 204A so as to force, at least in part, one or more devices 204A to select and/or instantiate one or more objects 30A so as to include one or more specific and/or requested code versions. In this embodiment, a call may comprise one or more explicit and/or implicit requests to access, invoke, and/or utilize one or more sets of program instructions.

Also, additionally or alternatively, without departing from this embodiment, optimization parameters 220A may be associated with, at least in part, one or more processes 31, one or more devices 204A, and/or one or more usage models 420A. After instantiation, at least in part, of the one or more objects 30A and/or 202A, one or more objects 30A and/or 202A may be reconfigured, at least in part, so as to comprise, at least in part, one or more other (e.g. communication) interfaces 450 that may not be comprised, at least in part, in one or more sets of interfaces 402A. Such reconfiguration may be requested, at least in part, by one or more processes 31 (e.g., by generation and/or issuance of one or more subsequent data structures 560 having suitable elements and/or values). Additionally or alternatively, one or more mechanisms 20A . . . 20N may permit (e.g., via similar or analogous techniques), after the instantiation of the one or more objects 30A and/or 202A, the one or more processes to request, at least in part, the creation, at least in part, of one or more aliases 460 (see FIG. 4) to the one or more objects 30A and/or 202A. In this embodiment, an alias to a first object may be or comprise one or more other objects that may be associated with and/or comprise the same circuitry as the first object, but may be associated with and/or comprise one or more sets of program instructions that are not associated with and/or comprised in the first object. For example, in this embodiment, one or more aliases 460 may reference and/or comprise one or more feature subsets 210A, but may utilize and/or comprise one or more coding versions 426 other than (and/or in addition to) one or more coding versions 424 that may be utilized and/or comprised in one or more objects 202A and/or 30A.

In this embodiment, one or more mechanisms 20A . . . 20N, and/or API 602, 606 may permit, at least in part, one or more processes 31 to provide, at least in part, one or more address vectors (e.g., 308) to one or more devices 204A and/or one or more objects 202A and/or 30A. In this embodiment, an address vector may be, comprise, and/or indicate, at least in part, multiple addresses (e.g., in one or more tables or other data structures) that may be resolved (e.g., as part of a group operation that operates on all of the elements of the address vector concurrently) into one or more corresponding addresses. For example, one or more address vectors 308 may be, comprise, and/or indicate, at least in part, multiple source and/or destination addresses 310A . . . 310N that are to be resolved, at least in part, by one or more devices 204A and/or one or more objects 202A and/or 30A in order to carry out one or more communication operations that may be requested by one or more processes 31 via, for example, one or more mechanisms 20A, 20B, and/or one or more API 604, 612, 614, and/or 618. For example, in this embodiment, one or more vectors 308 and/or addresses 310A . . . 310N may be in accordance with address format 302, and/or such resolution may be and/or comprise, at least in part, translating and/or converting, as a group and/or as part of one or more group operations, one or more vectors 308 and/or addresses 310A . . . 310N into addresses 312A . . . 312N that may be in accordance with address format 304. Additionally or alternatively, one or more vectors 308 and/or addresses 310A . . . 310N may be, comprise, and/or indicate, at least in part, multiple logical/virtual/network/internetwork addresses, and such resolution may be and/or comprise, for example, translating and/or converting, as a group and/or as part of one or more group operations, them into one or more physical/medium access control addresses 312A . . . 312N, or vice versa.

Advantageously, in this embodiment, one or more address vectors 308 may be shared, at least in part, between or among multiple processes, devices, nodes, and/or objects. Advantageously, the use of such address vectors and/or resolution/translation operations associated with them, may reduce memory/CPU usage/consumption in this embodiment. Further advantageously, the use of such address vectors and/or such resolution/translation operations may improve scalability of the one or more networks 100 and/or 51, for example, by permitting one or more processes 31 to be able to collectively reference one or more vectors 308 for one or more data transfer commands (e.g., instead of referencing individual addresses therein), thereby providing a concise mechanism for use in communicating collective operations involving multiple communication endpoints.

After one or more objects 202A and/or 30A have been allocated, configured, and/or instantiated, at least in part, one or more processes 31 may communicate, at least in part, with one or more objects 202A and/or 30A (and/or one or more devices 204A) via one or more mechanisms 20A, 20B. For example, as shown in FIG. 6, depending upon the nature of the communication operation involved in such communication, the communication may be carried out, at least in part, by exchanging data and/or commands between one or processes 31 and/or objects 202A, 30A, via mechanisms 20A, 20B, and/or one or more appropriate ones of the API 604, 612, 614, and/or 618. Additionally or alternatively, one or more other communication API 650 may be comprised, at least in part, one or more API 604. One or more API 650 may permit, for example, one or more other communication operations that may facilitate, at least in part, use of additional types, modes, and/or protocols of communication. The use and/or support of these one or more interfaces 650, one or more other communication operations, and/or additional types, modes, and/or protocols of communication may be requested, at least in part, in and/or one or more via one or more other queries 82. Examples of these one or more other communication operations, and/or additional types, modes, and/or protocols of communication may include, but are not limited to, other verbs/function libraries, collective operations, atomic operations, etc.

In this embodiment, prior to issuing one or more queries 62, devices 204A . . . 204N and/or nodes 10A . . . 10N may register, e.g., their respective resources, feature sets, etc., with and/or via one or more mechanisms 20A . . . 20N. Such registration may result, at least in part, in notification, at least in part, of one or more mechanisms 20A . . . 20N, devices 204A . . . 204N, one or more applications 31, and/or nodes 10A . . . 10N of availability to be accessed and/or utilized in accordance with this embodiment.

In this embodiment, a set of items joined by the term "and/or" may mean any subset of the set of items. For example, in this embodiment, the phrase "A, B, and/or C" may mean the subset A (taken singly), the subset B (taken singly), the subset C (taken singly), the subset A and B, the subset A and C, the subset B and C, or the subset A, B, and C. Analogously, in this embodiment, a set of items joined by the phrase "at least one of" may mean any subset of the set of items. For example, in this embodiment, the phrase "at least one of A, B, and/or C" may mean the subset A (taken singly), the subset B (taken singly), the subset C (taken singly), the subset A and B, the subset A and C, the subset B and C, or the subset A, B, and C.

Thus, in a first example in this embodiment, a network-associable apparatus is provided that may be usable in association, at least in part, with a network. The apparatus may comprise at least one interface mechanism to permit, at least in part, at least one process to allocate, at least in part, and/or configure, at least in part, at least one network-associated object in accordance with at least one parameter set that may correspond, at least in part, to at least one query issued by the at least one process via the at least one mechanism. The at least one object may be at least one of a plurality of possible objects that may be capable of being instantiated based at least in part upon at least one feature set of at least one device in the network. The at least one device may select the at least one object to be instantiated based at least in part upon optimization parameters and the at least one parameter set. The at least one device may map the at least one object to at least one subset of the at least one feature set that may correspond, at least in part, to the at least one parameter set.

In a second example in this embodiment that may comprise some or all of the elements of the first example, the at least one device may comprise a plurality of devices. In this second example, the at least one query may be based, at least in part, upon at least one query request parameter that may be to request information from the devices that may be related to communication interface capabilities of the devices. The at least one query request parameter may comprise at least one subset of the at least one parameter set. The at least one mechanism may provide the information to the at least one process in a manner that may indicate, at least in part, at least one portion of the information that may be most likely to best satisfy the at least one query request parameter.

In a third example in this embodiment that may comprise some or all of the elements of the second example, the at least one query request parameter may be related, at least in part, to at least one requested addressing format. The at least one device may be capable of translating the at least one requested addressing format into at least one other addressing format that may be utilized by the at least one device for at least one operation implemented, at least in part, by the at least one device. The at least one mechanism may expose, at least in part, at least one authorization key to be used, at least in part, to determine, whether the information that may be provided to the at least one process may be limited, at least in part. The at least one mechanism may permit the at least one process to provide, at least in part, at least one address vector to the at least one device. The at least one address vector may indicate multiple destination addresses that may be resolved, at least in part, by the at least one object in carrying out, at least in part, a communication operation requested, at least in part, by the at least one process via the at least one mechanism.

In a fourth example in this embodiment that may comprise some or all of the elements of any of the preceding examples, the possible objects may comprise respective sets of interfaces that may comprise respective sets of calls that may be associated with respective usage models of the at least one device. At least two of the sets of calls may include respective calls that may perform an identical function utilizing different respective coding versions that may be best suited to different respective ones of the usage models. The at least one parameter set may correspond, at least in part, to at least one of the usage models. The at least one device may select the at least one object to be instantiated such that the at least one object may comprise at least one of the sets of interfaces that may comprise at least one of the respective sets of calls that may best fit the at least one of the usage models that may correspond, at least in part, to the at least one parameter set. The at least one mechanism may permit, at least in part, the at least one process to override, at least in part, selection by the at least one device of the at least one object that is to be instantiated.

In a fifth example in this embodiment that may comprise some or all of the elements of the fourth example, the optimization parameters may be associated with, at least in part, the at least one process, the at least one device, and the at least one of the usage models. After instantiation of the at least one object, the at least one object may be reconfigured so as to comprise at least one other interface that may not be comprised in the at least one of the sets of interfaces. The at least one mechanism may permit, after the instantiation, the at least one process to request creation of at least one alias to the at least one object. The at least one alias may reference the at least one subset of the at least one feature set. The at least one alias may utilize at least one of the different respective coding versions. The at least one object may utilize at least one other of the different respective coding versions.

In a sixth example in this embodiment that may comprise some or all of the elements of any of the preceding examples, the at least one parameter set may comprise elements that may correspond, at least in part, to attributes of the at least one object. The attributes may be specified, at least in part, in at least one data structure that may be issued from the at least one process and may be received, at least in part, by the at least one mechanism. The at least one process may be at least one user application. The at least one data structure may comprise, at least in part, at least one field that may indicate, at least in part, which other elements of the at least one data structure may contain values that may have been validly enumerated by the at least one application.

In a seventh example in this embodiment that may comprise some or all of the elements of the sixth example, the other elements may comprise at least one addressing format element that may indicate, at least in part, at least one data addressing format that the at least one application may employ, at least in part, in communicating with the at least one object via the at least one mechanism. The other elements also may comprise at least one data format element that may indicate, at least in part, at least one data format that the at least one application may employ, at least in part, in communicating with the at least one object via the at least one mechanism.

In an eighth example in this embodiment that may comprise some or all of the elements of the seventh example, the at least one data format may comprise at least one event data format for event data that may be obtained, at least in part, from at least one event queue associated, at least in part, with the at least one object. The event data may comprise successfully-completed operation data and unsuccessfully-completed operation data. The at least one event data format may be selectable, at least in part, by the at least one application, such that a manner in which the successfully-completed operation data and the unsuccessfully completed operation data may be interspersed with each other in being reported to the at least one process may be selectable, at least in part.

In a ninth example in this embodiment that may comprise some or all of the elements of any of the preceding examples, the at least one mechanism may comprise at least one control interface and/or at least one communication operation interface. The at least one control interface may comprise one or more of the following control interfaces: (a) a discovery control interface that may facilitate, at least in part, the at least one query, (b) an addressing control interface that may facilitate control, at least in part, of at least one addressing parameter associated, at least in part, with the at least one object, (c) a connection services control interface that may facilitate control, at least in part, of at least one communication connection parameter associated, at least in part, with the at least one object, and/or (d) an data format control interface that may facilitate control, at least in part, of at least one data format that may be employed, at least in part, in communications between the at least one object and the at least one process via the at least one mechanism. The at least one communication operation interface may comprise one or more of the following communication operation interfaces: (1) a message queue interface that may facilitate, at least in part, sending data and/or receiving of data via at least one message queue, (2) a tagged message queue interface that may facilitate, at least in part, sending and/or receiving of at least one tagged message, and/or (3) a remote direct memory access (RDMA) communication interface that may facilitate, at least in part, at least one RDMA data transfer operation that may involve, at least in part, the at least one process and the at least one object.

In a tenth example of this embodiment, one or more computer-readable memories are provided that store one or more instructions that when executed by a machine may result in the performance of operations that may comprise (1) the operations that may be performed by the apparatus in any of the apparatus' preceding examples, and/or (2) any combination of any of the operations performed by the apparatus in any of the apparatus' preceding examples. In an eleventh example of this embodiment, a network-associable method is provided that may be implemented, at least in part, in association with a network. The method may comprise (1) the operations that may be performed by the apparatus in any of the apparatus' preceding examples, (2) any combination of any of the operations performed by apparatus in any of the apparatus' preceding examples, and/or (3) any combination of any of the operations that may be performed by execution of the one or more instructions stored in the one or more computer-readable memories of the tenth example of this embodiment.

In a twelve example of this embodiment, means may be provided to carry out any of, and/or any combination of, the operations that may be performed by the method, apparatus, and/or one or more computer-readable memories in any of the preceding examples. In a thirteenth example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment).

Advantageously, in this embodiment, hardware or software developed in accordance with a particular programming model, and/or for use with a specific interface and/or fabric hardware may be more easily redeployed for use and/or or interoperate with, other hardware or software developed in accordance with different programming models, and/or for use with other interfaces and/or fabric hardware. Also advantageously, the features of in this embodiment may make it easier to combine and/or utilize library functions, interfaces, etc. associated with a specific programming model and/or fabric hardware, with other library functions, interfaces, etc. associated with other programming models and/or fabric hardware. Further advantageously, this embodiment may permit cohesive, robust interoperability of multiple different programming models, libraries, interfaces, and/or fabric hardware in a single system and/or network. Also, advantageously, the features of this embodiment may facilitate relatively easy extensibility of the programming models, libraries, and/or interfaces employed (e.g., so as to be enhanced to support new, other, and/or additional features, capabilities, functions, etc.), while also permitting implementation of hardware-specific optimizations.

What is claimed is:

1. A network-associable apparatus usable in association, at least in part, with a network, the apparatus comprising:
at least one interface mechanism to permit, at least in part, at least one process to at least one of allocate, at least in part, and configure, at least in part, at least one network-associated object in accordance with at least one parameter set corresponding, at least in part, to at least one query issued by the at least one process via the at least one mechanism;
the at least one object being at least one of a plurality of possible objects that are capable of being instantiated based at least in part upon at least one feature set of at least one device in the network, the at least one device to select the at least one object to be instantiated based at least in part upon optimization parameters and the at least one parameter set, the at least one device to map the at least one object to at least one subset of the at least one feature set that corresponds, at least in part, to the at least one parameter set;
the at least one device being capable of being used to implement, at least in part, respective usage models, the respective usage models being capable of comprising different respective uses that are related to, at least in part, respective cloud computing, micro-server, and/or financial services uses;

the possible objects comprising respective sets of interfaces that comprise respective sets of calls that are associated with implementing the respective usage models;

the at least two of the sets of calls including respective calls that perform an identical function utilizing different respective coding versions that are best suited to different respective ones of the respective usage models.

2. The apparatus of claim 1, wherein:

the at least one device comprises a plurality of devices;

the at least one query is based, at least in part, upon at least one query request parameter that is to request information from the devices that is related to communication interface capabilities of the devices;

the at least one query request parameter comprises at least one subset of the at least one parameter set; and the at least one mechanism is to provide the information to the at least one process in a manner that indicates, at least in part, at least one portion of the information that is most likely to best satisfy the at least one query request parameter.

3. The apparatus of claim 2, wherein:

the at least one query request parameter is related, at least in part, to at least one requested addressing format;

the at least one device is capable of translating the at least one requested addressing format to at least one other addressing format that is utilized by the at least one device for at least one operation implemented, at least in part, by the at least one device;

the at least one mechanism is to expose, at least in part, at least one authorization key to be used, at least in part, to determine, whether the information that is to be provided to the at least one process is to be limited, at least in part;

the at least one mechanism is to permit the at least one process to provide, at least in part, at least one address vector to the at least one device; and the at least one address vector indicates multiple destination addresses that are to be resolved, at least in part, by the at least one object in carrying out, at least in part, a communication operation requested, at least in part, by the at least one process via the at least one mechanism.

4. The apparatus of claim 1, wherein:

the at least one parameter set corresponds, at least in part, to at least one of the usage models;

the at least one device is to select the at least one object to be instantiated such that the at least one object comprises at least one of the sets of interfaces that comprises at least one of the respective sets of calls that best fits the at least one of the usage models that corresponds, at least in part, to the at least one parameter set; and the at least one mechanism is to permit, at least in part, the at least one process to override, at least in part, selection by the at least one device of the at least one object to be instantiated.

5. The apparatus of claim 4, wherein:

the optimization parameters are associated with, at least in part, the at least one process, the at least one device, and the at least one of the usage models;

after instantiation of the at least one object, the at least one object is to be reconfigured so as to comprise at least one other interface that is not comprised in the at least one of the sets of interfaces;

the at least one mechanism is to permit, after the instantiation, the at least one process to request creation of at least one alias to the at least one object;

the at least one alias references the at least one subset of the at least one feature set;

the at least one alias utilizes at least one of the different respective coding versions; and the at least one object utilizes at least one other of the different respective coding versions.

6. The apparatus of claim 1, wherein:

the at least one parameter set comprises elements that correspond, at least in part, to attributes of the at least one object;

the attributes are to be specified, at least in part, in at least one data structure to be issued from the at least one process and to be received, at least in part, by the at least one mechanism;

the at least one process is at least one user application; and the at least one data structure comprises, at least in part, at least one field to indicate, at least in part, which other elements of the at least one data structure contain values that have been validly enumerated by the at least one application.

7. The apparatus of claim 6, wherein:

the other elements comprise:

at least one addressing format element to indicate, at least in part, at least one data addressing format that the at least one application is to employ, at least in part, in communicating with the at least one object via the at least one mechanism; and at least one data format element to indicate, at least in part, at least one data format that the at least one application is to employ, at least in part, in communicating with the at least one object via the at least one mechanism.

8. The apparatus of claim 7, wherein:

the at least one data format comprises at least one event data format for event data to be obtained, at least in part, from at least one event queue associated, at least in part, with the at least one object;

the event data comprises successfully-completed operation data and unsuccessfully-completed operation data;

the at least one event data format is selectable, at least in part, by the at least one application, such that a manner in which the successfully-completed operation data and the unsuccessfully completed operation data are to be interspersed with each other in being reported to the at least one process is selectable, at least in part.

9. The apparatus of claim 1, wherein: the at least one mechanism comprises at least one control interface and at least one communication operation interface; the at least one control interface comprises at least one of the following control interfaces: a discovery control interface to facilitate, at least in part, the at least one query; an addressing control interface to facilitate control, at least in part, of at least one addressing parameter associated, at least in part, with the at least one object; a connection services control interface to facilitate control, at least in part, of at least one communication connection parameter associated, at least in part, with the at least one object; a data format control interface to facilitate control, at least in part, of at least one data format to be employed, at least in part, in communications between the at least one object and the at least one process via the at least one mechanism; and the at least one communication operation interface comprises at least one of the following communication operation interfaces: a message queue interface to facilitate, at least in part, at least one of sending data and receiving data via at least one message queue; a tagged message queue interface to facilitate, at least in part, at least one of sending and receiving at least one tagged message; and a remote direct memory access (RDMA) communication interface to facilitate, at least in part, at least one RDMA data transfer operation involving, at least in part, the at least one process and the at least one object.

10. One or more computer-readable memories storing one or more instructions that when executed by a machine result in performance of operations comprising:
providing, at least in part, at least one interface mechanism to permit, at least in part, at least one process to at least one of allocate, at least in part, and configure, at least in part, at least one network-associated object in accordance with at least one parameter set corresponding, at least in part, to at least one query issued by the at least one process via the at least one mechanism;
the at least one object being at least one of a plurality of possible objects that are capable of being instantiated based at least in part upon at least one feature set of at least one device in the network, the at least one device to select the at least one object to be instantiated based at least in part upon optimization parameters and the at least one parameter set, the at least one device to map the at least one object to at least one subset of the at least one feature set that corresponds, at least in part, to the at least one parameter set;
the at least one device being capable of being used to implement, at least in part, respective usage models, the respective usage models being capable of comprising different respective uses that are related to, at least in part, respective cloud computing, micro-server, and/or financial services uses;
the possible objects comprising respective sets of interfaces that comprise respective sets of calls that are associated with implementing the respective usage models;
the at least two of the sets of calls including respective calls that perform an identical function utilizing different respective coding versions that are best suited to different respective ones of the respective usage models.

11. The one or more memories of claim 10, wherein:
the at least one device comprises a plurality of devices;
the at least one query is based, at least in part, upon at least one query request parameter that is to request information from the devices that is related to communication interface capabilities of the devices;
the at least one query request parameter comprises at least one subset of the at least one parameter set; and
the at least one mechanism is to provide the information to the at least one process in a manner that indicates, at least in part, at least one portion of the information that is most likely to best satisfy the at least one query request parameter.

12. The one or more memories of claim 11, wherein:
the at least one query request parameter is related, at least in part, to at least one requested addressing format;
the at least one device is capable of translating the at least one requested addressing format to at least one other addressing format that is utilized by the at least one device for at least one operation implemented, at least in part, by the at least one device;
the at least one mechanism is to expose, at least in part, at least one authorization key to be used, at least in part, to determine, whether the information that is to be provided to the at least one process is to be limited, at least in part;
the at least one mechanism is to permit the at least one process to provide, at least in part, at least one address vector to the at least one device; and
the at least one address vector indicates multiple destination addresses that are to be resolved, at least in part, by the at least one object in carrying out, at least in part, a communication operation requested, at least in part, by the at least one process via the at least one mechanism.

13. The one or more memories of claim 10, wherein:
the at least one parameter set corresponds, at least in part, to at least one of the usage models;
the at least one device is to select the at least one object to be instantiated such that the at least one object comprises at least one of the sets of interfaces that comprises at least one of the respective sets of calls that best fits the at least one of the usage models that corresponds, at least in part, to the at least one parameter set; and
the at least one mechanism is to permit, at least in part, the at least one process to override, at least in part, selection by the at least one device of the at least one object to be instantiated.

14. The one or more memories of claim 13, wherein:
the optimization parameters are associated with, at least in part, the at least one process, the at least one device, and the at least one of the usage models;
after instantiation of the at least one object, the at least one object is to be reconfigured so as to comprise at least one other interface that is not comprised in the at least one of the sets of interfaces;
the at least one mechanism is to permit, after the instantiation, the at least one process to request creation of at least one alias to the at least one object;
the at least one alias references the at least one subset of the at least one feature set;
the at least one alias utilizes at least one of the different respective coding versions; and
the at least one object utilizes at least one other of the different respective coding versions.

15. The one or more memories of claim 10, wherein:
the at least one parameter set comprises elements that correspond, at least in part, to attributes of the at least one object;
the attributes are to be specified, at least in part, in at least one data structure to be issued from the at least one process and to be received, at least in part, by the at least one mechanism;
the at least one process is at least one user application; and
the at least one data structure comprises, at least in part, at least one field to indicate, at least in part, which other elements of the at least one data structure contain values that have been validly enumerated by the at least one application.

16. The one or more memories of claim 15, wherein:
the other elements comprise:
at least one addressing format element to indicate, at least in part, at least one data addressing format that the at least one application is to employ, at least in part, in communicating with the at least one object via the at least one mechanism; and
at least one data format element to indicate, at least in part, at least one data format that the at least one application is to employ, at least in part, in communicating with the at least one object via the at least one mechanism.

17. The one or more memories of claim 16, wherein:
the at least one data format comprises at least one event data format for event data to be obtained, at least in part, from at least one event queue associated, at least in part, with the at least one object;
the event data comprises successfully-completed operation data and unsuccessfully-completed operation data;
the at least one event data format is selectable, at least in part, by the at least one application, such that a manner in which the successfully-completed operation data and the unsuccessfully completed operation data are to be interspersed with each other in being reported to the at least one process is selectable, at least in part.

18. The one or more memories of claim 10, wherein: the at least one mechanism comprises at least one control interface and at least one communication operation interface; the at least one control interface comprises at least one of the following control interfaces: a discovery control interface to facilitate, at least in part, the at least one query; an addressing control interface to facilitate control, at least in part, of at least one addressing parameter associated, at least in part, with the at least one object; a connection services control interface to facilitate control, at least in part, of at least one communication connection parameter associated, at least in part, with the at least one object; a data format control interface to facilitate control, at least in part, of at least one data format to be employed, at least in part, in communications between the at least one object and the at least one process via the at least one mechanism; and the at least one communication operation interface comprises at least one of the following communication operation interfaces: a message queue interface to facilitate, at least in part, at least one of sending data and receiving data via at least one message queue; a tagged message queue interface to facilitate, at least in part, at least one of sending and receiving at least one tagged message; and a remote direct memory access (RDMA) communication interface to facilitate, at least in part, at least one RDMA data transfer operation involving, at least in part, the at least one process and the at least one object.

19. A network-associable method implemented, at least in part, in association with a network, the method comprising:
providing, at least in part, at least one interface mechanism to permit, at least in part, at least one process to at least one of allocate, at least in part, and configure, at least in part, at least one network-associated object in accordance with at least one parameter set corresponding, at least in part, to at least one query issued by the at least one process via the at least one mechanism;
the at least one object being at least one of a plurality of possible objects that are capable of being instantiated based at least in part upon at least one feature set of at least one device in the network, the at least one device to select the at least one object to be instantiated based at least in part upon optimization parameters and the at least one parameter set, the at least one device to map the at least one object to at least one subset of the at least one feature set that corresponds, at least in part, to the at least one parameter set;
the at least one device being capable of being used to implement, at least in part, respective usage models, the respective usage models being capable of comprising different respective uses that are related to, at least in part, respective cloud computing, micro-server, and/or financial services uses;
the possible objects comprising respective sets of interfaces that comprise respective sets of calls that are associated with implementing the respective usage models;
the at least two of the sets of calls including respective calls that perform an identical function utilizing different respective coding versions that are best suited to different respective ones of the respective usage models.

20. The method of claim 19, wherein:
the at least one device comprises a plurality of devices;
the at least one query is based, at least in part, upon at least one query request parameter that is to request information from the devices that is related to communication interface capabilities of the devices;
the at least one query request parameter comprises at least one subset of the at least one parameter set; and
the at least one mechanism is to provide the information to the at least one process in a manner that indicates, at least in part, at least one portion of the information that is most likely to best satisfy the at least one query request parameter.

21. The method of claim 20, wherein:
the at least one query request parameter is related, at least in part, to at least one requested addressing format;
the at least one device is capable of translating the at least one requested addressing format to at least one other addressing format that is utilized by the at least one device for at least one operation implemented, at least in part, by the at least one device;
the at least one mechanism is to expose, at least in part, at least one authorization key to be used, at least in part, to determine, whether the information that is to be provided to the at least one process is to be limited, at least in part;
the at least one mechanism is to permit the at least one process to provide, at least in part, at least one address vector to the at least one device; and
the at least one address vector indicates multiple destination addresses that are to be resolved, at least in part, by the at least one object in carrying out, at least in part, a communication operation requested, at least in part, by the at least one process via the at least one mechanism.

22. The method of claim 21, wherein:
the at least one parameter set corresponds, at least in part, to at least one of the usage models;
the at least one device is to select the at least one object to be instantiated such that the at least one object comprises at least one of the sets of interfaces that comprises at least one of the respective sets of calls that best fits the at least one of the usage models that corresponds, at least in part, to the at least one parameter set; and
the at least one mechanism is to permit, at least in part, the at least one process to override, at least in part, selection by the at least one device of the at least one object to be instantiated.

23. A network-associable apparatus usable in association, at least in part, with a network, the apparatus comprising:
at least one interface means to permit, at least in part, at least one process to at least one of allocate, at least in part, and configure, at least in part, at least one network-associated object in accordance with at least one parameter set corresponding, at least in part, to at least one query issued by the at least one process via the at least one means;

the at least one object being at least one of a plurality of possible objects that are capable of being instantiated based at least in part upon at least one feature set of at least one device in the network, the at least one device to select the at least one object to be instantiated based at least in part upon optimization parameters and the at least one parameter set, the at least one device to map the at least one object to at least one subset of the at least one feature set that corresponds, at least in part, to the at least one parameter set;

the at least one device being capable of being used to implement, at least in part, respective usage models, the respective usage models being capable of comprising different respective uses that are related to, at least in part, respective cloud computing, micro-server, and/or financial services uses;

the possible objects comprising respective sets of interfaces that comprise respective sets of calls that are associated with implementing the respective usage models;

the at least two of the sets of calls including respective calls that perform an identical function utilizing different respective coding versions that are best suited to different respective ones of the respective usage models.

24. The apparatus of claim 23, wherein:
the at least one device comprises a plurality of devices;
the at least one query is based, at least in part, upon at least one query request parameter that is to request information from the devices that is related to communication interface capabilities of the devices;
the at least one query request parameter comprises at least one subset of the at least one parameter set; and
the at least one means is to provide the information to the at least one process in a manner that indicates, at least in part, at least one portion of the information that is most likely to best satisfy the at least one query request parameter.

25. The apparatus of claim 24, wherein:
the at least one query request parameter is related, at least in part, to at least one requested addressing format;
the at least one device is capable of translating the at least one requested addressing format to at least one other addressing format that is utilized by the at least one device for at least one operation implemented, at least in part, by the at least one device;
the at least one means is to expose, at least in part, at least one authorization key to be used, at least in part, to determine, whether the information that is to be provided to the at least one process is to be limited, at least in part;
the at least one means is to permit the at least one process to provide, at least in part, at least one address vector to the at least one device; and
the at least one address vector indicates multiple destination addresses that are to be resolved, at least in part, by the at least one object in carrying out, at least in part, a communication operation requested, at least in part, by the at least one process via the at least one means.

* * * * *